United States Patent
Kappel et al.

[11] Patent Number: 6,062,533
[45] Date of Patent: May 16, 2000

[54] APPARATUS AND METHOD FOR VALVE CONTROL

[75] Inventors: Andreas Kappel, Brunnthal; Randolf Mock, Munich; Hans Meixner, Haar, all of Germany

[73] Assignee: Siemens Aktiengesellschaft, Munich, Germany

[21] Appl. No.: 09/312,692

[22] Filed: May 14, 1999

[30] Foreign Application Priority Data

May 14, 1998 [DE] Germany ............................ 198 21 768

[51] Int. Cl.⁷ .................................................. F16K 31/12
[52] U.S. Cl. ................................................. 251/57; 239/91
[58] Field of Search ..................... 251/28, 129.06, 251/57, 129.14; 239/88, 89, 90, 91, 96, 102.2, 124

[56] References Cited

U.S. PATENT DOCUMENTS

| | | | |
|---|---|---|---|
| 2,015,887 | 10/1935 | Eek | 299/107.2 |
| 2,521,224 | 9/1950 | Kammer | 299/107.6 |
| 2,573,231 | 10/1951 | Teague, Jr. | 137/53 |
| 2,890,657 | 6/1959 | May et al. | 239/90 |
| 4,813,601 | 3/1989 | Schwerdt et al. | |
| 5,934,560 | 8/1999 | Barry | 239/89 |

FOREIGN PATENT DOCUMENTS

| | | |
|---|---|---|
| 0 477 400 A1 | 9/1990 | European Pat. Off. . |
| 982272 | 3/1949 | France ..................... 239/89 |
| 27 11 3963 C2 | 3/1977 | Germany . |
| 43 06 073 C1 | 2/1993 | Germany . |
| 44 42 649 C2 | 11/1994 | Germany . |
| 195 00 706 A1 | 12/1995 | Germany . |
| 197 09 794 A1 | 3/1997 | Germany . |

*Primary Examiner*—Joseph A. Kaufman
*Assistant Examiner*—David A. Bonderer
*Attorney, Agent, or Firm*—Hill & Simpson

[57] ABSTRACT

A wall-controllable primary drive, for example a piezo actuator, guided in a first bore transfers its stroke motion-commutated onto a secondary-side lifter element guided in a second bore, transmitting said stroke by a piston-hydraulic stroke transmission on the basis of a hydraulic chamber. The pressure in a valve chamber is controlled via secondary-side lifter element.

31 Claims, 4 Drawing Sheets

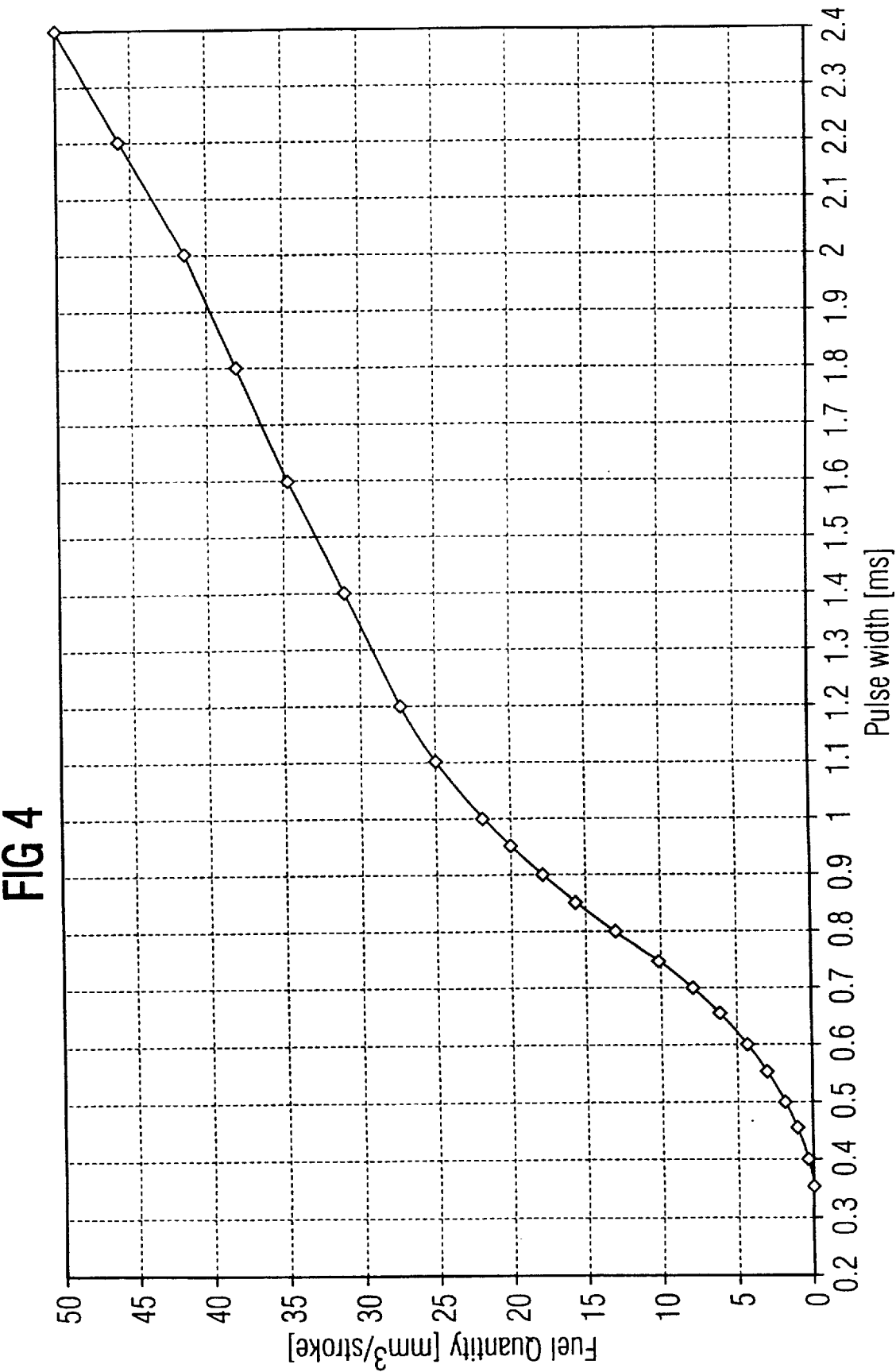

APPARATUS AND METHOD FOR VALVE CONTROL

FIELD OF THE INVENTION

The present invention relates to apparatuses for controlling the operation of valves. More specifically, the present invention relates to apparatuses for controlling valves that are components of hydraulic systems and/or fuel injection systems. The present invention also relates to methods for controlling valves.

BACKGROUND OF THE INVENTION

The significance of a fast and precise control of valve systems is increasing with increasing demands made of hydraulic systems. One example of such a field of activity is fuel injection, for example the direct injection of diesel fuel into the combustion chamber of a motor. What is referred to as the "common rail" system thereby has great potential, whereby the fuel from a central conveying pump is conveyed in a fluid conduit ("common rail") shared by all cylinders. The dosing of the fuel ensures via a system for fuel injection individually allocated to each cylinder. The improvement in motor operating behavior that can be achieved with the assistance of a common rail injection system thereby essentially results from an injection pressure up to 2,500 bar that can be controlled independently of the motor speed. Added thereto given this technology is the possibility of shaping the injection curve, i.e., generating a single or multiple pilot injection or the control of the injection rate, as well as of the free characteristics control of injection start and injection quantity.

For realizing these advantages, the system for fuel injection must meet an extremely high dynamic demand, for example it must exhibit a short operating dead time and a short switching time. Up to now, the control of common rail injectors has essentially occurred with the assistance of a solenoid drive. In individual cases, the injector is also controlled with the assistance of a piezo-hydraulic drive.

In the control of a fuel injector with the assistance of a piezoelectric direct drive for valve control of the hydraulic system, the problem arises, for example that only an inadequate compensation of a length modification of piezo actuator and housing caused by temperature or by aging and settling effects can be realized.

Added thereto is that a piezo actuator having a great structural length is required given the piezo direct drive, this being disadvantageous in terms of fabrication technology and in view of the manufacturing costs. Given a combination of the piezo actuator with a membrane hydraulics for valve control in the injection system, various problems occur such as, for example, a complicated mechanical balancing, a risk of rupture of the membranes as well as a low efficiency of the membrane hydraulics. Further unsatisfactory are, for example, the influence of pressure waves, a problematical temperature compensation as well as what is only an unsatisfactory switching behavior.

A further example of the use of a fast valve control is the braking circulation of a vehicle, whereby the hydraulic pressure in an anti-blocking system must be quickly and precisely regulated by the motor electronics. The use of a fast and precise valve control in the hydraulic circulation for controlling an elevator control or, respectively, vertical rudder in aircraft is also conceivable. Particularly given modem aircraft that are designed aerodynamically unstable, the guidance rudder must be driven very fast, so that the security of the aircraft is assured by an electronic stabilization of the flight attitude.

Therefore, there is a need for precise valve control that also reduces the affect of an influence on the switching behavior caused by operations or aging.

SUMMARY OF THE INVENTION

The present invention is comprised of utilizing an easily controllable primary drive whose lift is forwarded motion-commutated to the valve control by a piston-hydraulic lift transmitter.

The primary drive, i.e. a drive directly controllable from the outside, is attached axially displaceable in a first bore of a housing. The fit between primary drive and housing can thereby leak or can be advantageously hydraulically tight. The primary drive preferably has a linear response behavior, for example with a piezoelectric actuator whose length modification is linear relative to an electrical signal applied to the actuator in a very good approximation. Other suitable drive elements are, for example, electrostrictive or magnetostrictive actuators. The first bore and a second bore discharge into a fluid-filled hydraulic chamber. The primary drive is provided with a piston bore that likewise discharges into the hydraulic chamber. The lift element of the secondary side is affected by leakage and is arranged axially displaceable both in the piston bore as well as in the second bore. As a result thereof, a piston chamber is created as part of the piston bore, this being limited by the lifter element and the primary drive. The lifter element of the secondary side can also be composed of a variety of sub-elements, for example a lifter piston in the piston bore and a ram in the second bore. The primary drive thus has a hydraulic frictional connection with the lifter element attached at the secondary side. Below, "primary side" refers to elements that are attached in frictional connection from the primary drive up to, exclusively, the hydraulic chamber, for example a piezo actuator or a restoring element for the piezo actuator at the primary side. "Secondary side" refers to corresponding elements that are in frictional connection and follow the primary drive and the hydraulic chamber, for example a lifter element or, respectively, a lifter piston or a ram. At least two additional advantages derive by utilizing a hydraulic chamber:

(1) A lift of the primary drive that is possibly too slight for valve control is increased by the lift transmission onto the secondary-side lifter element to such extent that this lift is adequate for valve control (for example: 40 $\mu$m lift of the piezo actuator, 240 $\mu$m lift of the lifter element, corresponding to a lift translation of 6:1). The advantages of the primary drive, namely a very fast and linear response behavior, are united with the advantages of an adequate lift by the lift translation. Further, a disadvantage of the piezoelectric direct drive, namely a great piezo length, is avoided.

(2) Thermal length changes or length changes caused by aging as well as settling affects of both the piezo actuator as well as of the housing together with integrated parts thereof are largely compensated. This advantage is realized in that the piston chamber and, thus, the hydraulic chamber via the leakage between pressure piston and lifter element are pressure-charged with fluid via a piston conduit, whereby the pressure of the fluid in the conduit is essentially independent of the volume of these two chambers.

Given employment of a non-inventive double membrane for hydraulic force transmission, for example, these length influences could modify the volume within the double membrane and, thus, the pressure within the double membrane to such an extent that the force transmission between primary drive and secondary lifter elements is quantitatively changed.

Fluid losses, for example due to a leakage, the fit between the secondary-side lifter element and the bore surrounding it, are also compensated via the piston conduit. Further, the hydraulic chamber can be aerated, for example given initial utilization, via the conduit and an additionally attached aeration screw.

For realizing the piston-hydraulic lift translation, the pressure-active surface of the primary drive must be greater relative to the fluid in the hydraulic chamber than that of the secondary-side lifter element. The "pressure-active surface" thereby references the projection of the area in contact with the fluid of the hydraulic chamber into the indicated direction. For example, the pressure-active surface of a cylinder piston discharging perpendicularly into the hydraulic chamber corresponds to the end face of this cylinder.

The motion reverse of the secondary-side lifter element compared to the motion direction of the primary drive enables a simple method of valve control, so that, for example, the presence of a valve chamber, as in the case of a valve control without motion reversal opening inwardly into a valve chamber, can be foregone.

For realizing the motion reversal, the pressure-active surface of the secondary-side lifter element must be larger in the direction of the primary drive than the pressure-active surface in the direction of the second bore.

For valve control, the motion of the secondary-side lifter element is employed in order to close a fluid-filled connecting conduit off from a decrease to a lower pressure level. A hydraulic or hydraulic-mechanical system can be typically controlled via the pressure of the fluid in the valve chamber.

The valve control sequences in essentially the following steps:

(a) in quiescent position, the primary drive is at a maximally great distance from the hydraulic chamber or, respectively, from the second bore, for example given a discharged piezo actuator. Correspondingly, the volume of the hydraulic chamber is maximum. The pressure of the fluid in the piston chamber corresponds to the pressure in the piston conduit. Via the leakage due to the fit of the piston bore, fluid flows from the piston chamber into the hydraulic chamber. The secondary-side lifter element is pressed out of the piston bore by the pressure of the fluid in the piston chamber and is pressed into the piston bore by the pressure in the hydraulic chamber due to the motion reversal. Additionally, it can be pressed out of the piston bore by a restoring element of the secondary side. When the second bore is charged with pressure at its end opposite the hydraulic chamber, for example by the fluid in the connecting conduit, the lifter element is thereby likewise pressed into the piston bore. Overall, the lifter element is maximally displaced out of the piston bore; correspondingly, it is maximally displaced into the second bore. The connecting conduit is closed off relative to the discharge by the lifter element.

(b) During the lifting process, the primary drive is displaced in the direction of the hydraulic chamber, for example by applying an electrical signal. Since the volume of the hydraulic chamber is reduced, the pressure therein rises. The pressure on the secondary-side lifter element therefore likewise increases, so that this is more greatly pressed into the piston bore. Beginning with a specific pressure in the hydraulic chamber, the forces exerted on the lifter element and directed out of the piston bore are overcome, and the lifter element moves into the piston bore. As a result of this motion, the connection between connecting conduit and discharge is opened, so that the fluid flows out of the connecting conduit into the discharge and the pressure in the connecting conduit drops. It is advantageous for achieving a predetermined, maximum lift when a detent is present for limiting the lift of the secondary-side lifter element. A typical opening behavior of the valve control can thus be set such that the lifter element is maximally displaced within a short time after initially overcoming a counter-force. Such a control behavior has the advantage that the affect of a possible manufacturing difference, for example in the manufacture of a seal, is reduced.

(c) For return into the quiescent position, the primary drive is moved away from the hydraulic chamber, for example by discharging a piezo actuator. The pressure of the fluid in the hydraulic chamber drops to such an extent that the pressure of the fluid in the piston chamber and, potentially, the secondary-side restoring element in turn displays the lifter element out of the piston bore. When the secondary-side lifter element is displaced to such an extent that it again closes the connecting conduit from the discharge, then the pressure present in the quiescent condition again builds up in the connecting conduit.

This valve control has the advantage that a valve control can be simply and compactly realized. It also has the advantage that the relative alignment of the bores at the primary or, respectively, secondary side has no influence on the control behavior. For example, a plurality of secondary-side sub-elements, for example lifter elements in their respective bores, can be integrated into the valve control. The valve control can be precisely controlled in the same way by employing a very well-controllable primary drive with a short dead time, for example a piezo actuator.

It is advantageous when a pressure piston as part of the primary drive is let in the first bore at least partially countersunk, this being arranged axially displaceable therein and, additionally, in sealing fashion advantageously without leakage. Given such a design, the hydraulic chamber can be formed as part of the first bore by the housing and the piston. The piston bore is advantageously introduced into the pressure piston. The pressure piston is advantageously deflected by a separate actuating drive, for example a piezo actuator, lying against that side of the pressure piston facing away from the hydraulic chamber. The actuating drive is supported, for example, at the housing.

This design has the advantage that the primary drive can be constructed of simply worked discrete parts that can be respectively mechanically or, respectively, structurally optimized. For example, a specific protection of the actuating drive against a chemical influence of the fluid can be foregone due to the design as an open system.

The pressure piston, which need not be rigidly connected to the actuating drive, is advantageously pressed away from the hydraulic chamber by a primary-side restoring device, for example a spring. This restoring device additionally advantageously serves for mechanical pressure pre-stress, as a result whereof, for example, a piezo element is protected against damage due to tensile stresses. The primary-side restoring element advantageously also serves for mechanical pressure pre-stress, as a result whereof, for example, a ceramic-like actuating drive is protected against damage by tensile stresses.

It is also advantageous when a spherical disk or hemispherical disk with corresponding abutment is attached between actuating drive and pressure piston, so that tiltings or, respectively, gap variation can be compensated given end faces that are not plane-parallel. The abutment can, for example, be integrated in the pressure piston. Alternatively, the spherical disk with the corresponding abutment can also be attached between the actuating drive and the housing.

The secondary-side lifter element is advantageously designed such that it comprises a seal element at its end adjoining the connecting conduit, so that the conduit is closed off from the discharge by the seal element. The seal element can, for example, be a ball that presses onto the mouth of the connecting conduit in a shutoff chamber within the shutoff chamber on the basis of the remaining lifter element.

A plurality of secondary-side sub-elements can also be integrated in their respective bore in the valve control.

In an embodiment, the present invention provides an apparatus for controlling the operation of a valve, the apparatus comprising: a housing comprising a hydraulic chamber, the hydraulic chamber being disposed between a first bore and a second bore so that the first bore and the second bore discharge into the hydraulic chamber, the first bore at least partially accommodating a primary drive, the primary drive being axially displaceable within the first bore, the primary drive comprising a piston bore disposed therein, the second bore at least partially accommodating a secondary-side lifter element that extends through the hydraulic chamber and at least partially extends into the piston bore, the lifter element being axially displaceable within the second bore, hydraulic chamber and piston bore, the lifter element and the piston bore defining a piston chamber within the piston bore, the lifter element comprising a first surface disposed in the hydraulic chamber that faces the primary drive and the piston bore, the lifter element further comprising a second surface disposed in the hydraulic chamber that faces the secondary bore, the primary drive comprising a first surface disposed in the first bore that faces the hydraulic chamber and the first surface of the lifter element, the housing further comprising a piston conduit in communication with the piston chamber, the piston chamber being in communication with the hydraulic chamber, the second bore being connected to a connecting conduit with a distal end of the lifter element disposed therebetween, the second bore also being connected to a discharge conduit, the connecting conduit being maintained at a pressure greater than the discharge conduit, the first surface of the lifter element being smaller than the first surface of the primary drive, the first surface of the lifter element being smaller than the second surface of the lifter element, the distal end of the lifter element selectively isolating the connecting conduit from the discharge conduit.

In an embodiment, the apparatus further comprises a secondary-side restoring element disposed in the piston chamber and which engages the lifter element and biases the lifter element out of the piston chamber.

In an embodiment, the apparatus further comprises a filling conduit pressurized with fluid and which is connected to the hydraulic chamber, the filling conduit comprising a filling valve that is biased towards a closed position and opens when the hydraulic chamber reaches a predetermined low pressure.

In an embodiment, the first bore, the second bore and of the piston bore are coaxial.

In an embodiment, the primary drive comprises a pressure piston disposed between the hydraulic chamber and an actuating drive, the actuating drive displacing the pressure piston in the first bore, the primary drive further comprising a primary-side restoring element disposed between the pressure piston and the hydraulic chamber, the primary-side restoring element biasing the pressure piston away from the hydraulic chamber, the piston bore being disposed in the pressure piston.

In an embodiment, the apparatus further comprises a hemi-spherical disk disposed between the actuating drive and the pressure piston.

In an embodiment, the apparatus further comprises a hemi-spherical disk disposed between the actuating drive and the housing.

In an embodiment, the actuating drive is an element selected from the group consisting of piezoelectric, electrostrictive and magnetostrictive.

In an embodiment, the primary-side restoring element is a tubular spring.

In an embodiment, the primary-side restoring element comprises at least one saucer spring.

In an embodiment, the apparatus further comprises at least one elastomer ring disposed between the primary drive and the housing for providing a seal therebetween.

In an embodiment, the second bore comprises a shutoff chamber, the distal end of the lifter being disposed in the shutoff chamber, the connecting conduit and the discharge conduit being connected to the shutoff chamber, the distal end of the lifter element further comprising a seal element for sealingly engaging the connecting conduit and isolating the connecting conduit from the discharge conduit.

In an embodiment, the lifter element further comprises a lifter piston at least partially disposed in the piston bore axially displaceable therein, the lifter piston being rigidly connected to a ram, the ram being partially disposed in the second bore and partially disposed in the hydraulic chamber.

In an embodiment, the lifter piston comprises a hollow cylinder comprising an open end that extends into the piston bore.

In an embodiment, the apparatus further comprises a secondary-side restoring element disposed in the piston chamber and which extends into the hollow cylinder and biases the lifter element out of the piston chamber.

In an embodiment, the hydraulic chamber is connected to a plurality of secondary-side sub-systems.

In an embodiment, said apparatus is a component of a hydraulic system.

In an embodiment, said apparatus is a component of a fuel injection system.

In an embodiment, the housing further comprises a further bore and a working piston disposed in the further bore, the further bore and working piston defining a working chamber, the connecting conduit being connected to the working chamber, the working chamber being connected to a feed conduit, movement of the working piston being controlled by pressure of the working chamber.

In an embodiment, the working chamber is connected to the feed conduit by way of a throttle bore that extends through the working piston.

In an embodiment, pressure in the working chamber controls whether the distal end of the lifter isolates the connecting conduit from the discharge conduit.

In an embodiment, the working piston is connected to a fuel injector needle disposed in the further bore, the further bore also comprising at least one nozzle, the working piston being biased away from the working chamber and the fuel injector needle being biased towards the nozzle by a fuel injector spring, the further bore further comprising a fuel chamber, the fuel chamber being connected to the feed conduit, the working piston further comprising a first end disposed in the working chamber and a second end disposed in the fuel chamber, pressure in the fuel chamber biasing the working piston towards the working chamber.

In an embodiment, the present invention provides a method for controlling a valve, the method comprising the following steps: providing an apparatus comprising a housing comprising a hydraulic chamber, the hydraulic chamber being disposed between a first bore and a second bore so that the first bore and the second bore discharge into the hydraulic chamber, the first bore at least partially accommodating a primary drive, the primary drive being axially displaceable within the first bore, the primary drive comprising a piston bore disposed therein, the second bore at least partially accommodating a secondary-side lifter element that extends through the hydraulic chamber and at least partially extends into the piston bore, the lifter element being axially displaceable within the second bore, hydraulic chamber and piston bore, the lifter element and the piston bore defining a piston chamber within the piston bore, the housing further comprising a piston conduit in communication with the piston chamber, the piston chamber being in communication with the hydraulic chamber, the second bore being connected to a connecting conduit with a distal end of the lifter element disposed therebetween, the second bore also being connected to a discharge conduit; during at least a portion of the operation of the valve, maintaining the valve in a quiescent position wherein the primary drive is displaced away from the hydraulic chamber, the lifter element is displaced away from the piston bore and into the second bore and the distal end of the lifter element isolates the connecting conduit from the discharge conduit; during at least a portion of the operation of the valve, moving the lifter element into the piston bore by reducing the volume of the hydraulic chamber with the primary drive so that the pressure the hydraulic chamber is increased resulting in the lifter element being moved into the piston bore and the distal end of the lifter element away from the connecting conduit thereby establishing communication between the connecting conduit and the discharge conduit thereby reducing pressure in the connecting conduit; returning the valve to the quiescent position by pushing the primary drive away from the hydraulic chamber so that the pressure therein decreases and resulting in movement of the lifter element away from the piston bore to the distal end of the lifter element engages the connecting conduit and isolates the connecting conduit from the discharge conduit; leaking fluid between the piston chamber and the hydraulic chamber; replenishing fluid leaked from the piston chamber with fluid supplied from the piston conduit.

In an embodiment, the primary drive comprises a pressure piston disposed between the hydraulic chamber and an actuating drive, the actuating drive having a length and displacing the pressure piston in the first bore, the primary drive further comprising a primary-side restoring element disposed between the pressure piston and the hydraulic chamber, the primary-side restoring element biasing the pressure piston away from the hydraulic chamber, the piston bore being disposed in the pressure piston; and the step of maintaining the valve in the quiescent position further comprises reducing the length of the actuating drive resulting in the pressure piston being pushed maximally away from the hydraulic chamber by the primary-side restoring element and the pressure the hydraulic chamber; and the step of lifting the lifter element further comprises increasing the length of the actuating drive so that the pressure piston is pushed in the direction of the hydraulic chamber by the actuating drive; and the step of returning the valve to the quiescent position further comprises reducing the length of the actuating drive so that the pressure piston is pushed away from the hydraulic chamber by the primary-side restoring element and the pressure in the hydraulic chamber.

In an embodiment, the valve is part of a fuel injection system and the housing further comprises a further bore and a working piston disposed in the further bore, the further bore and working piston defining a working chamber, the connecting conduit being connected to the working chamber, the working chamber being connected to a feed conduit, the working chamber is connected to the feed conduit by way of a throttle bore that extends through the working piston, wherein pressure in the working chamber controls whether the distal end of the lifter isolates the connecting conduit from the discharge conduit, the working piston being connected to a fuel injector needle disposed in the further bore, the further bore also comprising a nozzle, the working piston being biased away from the working chamber and the needle being biased towards sealing engagement with the nozzle by a fuel injector spring, the further bore further comprising a fuel chamber, the fuel chamber being connected to the feed conduit, the fuel chamber being in communication with the nozzle, the working piston further comprising a first end disposed in the working chamber and a second end disposed in the fuel chamber, pressure in the fuel chamber biasing the working piston towards the working chamber and the needle away from the nozzle, and the step of maintaining the valve in the quiescent position further comprises pushing the working piston away from the working chamber so that the fuel injection needle closes the nozzle in communication with the fuel chamber; and the step of lifting the lifting element further comprises reducing pressure in the working chamber by reducing pressure in the connecting conduit so that the working piston is displaced in the direction of the working chamber by pressure in the fuel chamber thereby moving the needle away from the nozzle and permitting the fluid to flow through the nozzle; and the step of returning the valve to the quiescent position further comprises increasing the pressure in the working chamber by increasing pressure in the connecting conduit so that, due to the pressure in the working chamber and the bias of the fuel injection spring, the working piston pushed away from the working chamber and the needle engages the nozzle.

In an embodiment, the pressure in the hydraulic chamber ranges from 1 to 25 bar.

In an embodiment, the pressure in the piston chamber in the quiescent position ranges from 100 to 2500 bar.

In an embodiment, the difference in length of the actuating drive between quiescent position and the lifting position ranges from 10 to 60 $\mu$m.

In an embodiment, the lifter element moves a distance ranging from 60 to 360 $\mu$m between the quiescent and lifting positions.

In an embodiment, the working piston moves a distance ranging from 120 to 360 $\mu$m between the quiescent and lifting positions.

In an embodiment, the actuating drive is an element selected from the group consisting of piezoelectric, electrostrictive and magnetostrictive.

Other objects and advantages of the invention will become apparent upon reading the following detailed description and appended claims, and upon reference to the accompanying drawings.

BRIEF DESCRIPTION OF THE DRAWINGS

The exemplary embodiments of the inventive valve control is shown schematically in the drawings wherein:

FIG. 4 illustrates, graphically, measured results of the present invention.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

DETAILED DESCRIPTION OF THE PRESENTLY PREFERRED EMBODIMENTS

Figure 1:
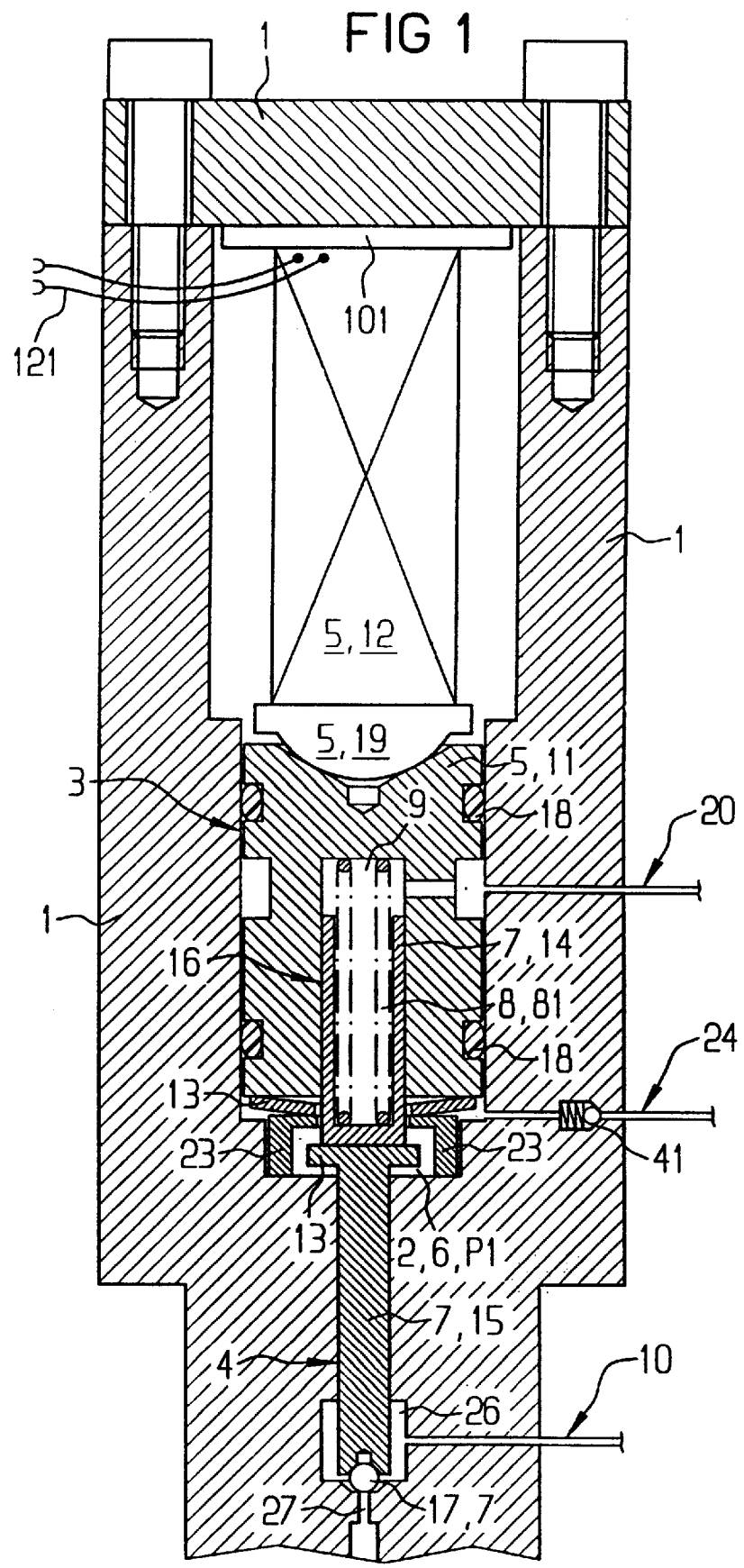
FIG. 1 is a sectional view of a valve control of the present invention.

As a sectional illustration, FIG. 1 shows an exemplary embodiment of a valve control in a side view. A first bore 3 is introduced in a housing 1. A pressure piston 11 as part of a primary drive assembly 5 is arranged in the first bore 3 axially displaceably and at least partially capable of being countersunk. A hydraulic chamber 2 that is defined by the housing 1 and the pressure piston 11 is created by this arrangement within the first bore 3. The pressure piston 11 is pressed away from the hydraulic chamber 2 by a primary-side restoring element 13. The primary-side restoring element 13 can, for example, be a tube spring (hollow cylinder with horizontal slots) or it can be advantageously composed of a plurality of saucer springs that are arranged parallel or in series.

Proceeding from its side facing away from the hydraulic chamber 2, the pressure piston 11 is moved by an actuating drive 12, whereby the actuating drive 12 is supported at the housing 1.

As further sub-element of the primary drive assembly 5, the actuating drive 12, is advantageously a piezo element, advantageously a multi-layer piezo actuator. A piezo actuator has the advantage that it reacts very quickly to control signals and its change in the length is linear—in a very good approximation—relative to the height of the control signal, for example a voltage or current signal. The employment of a piezo multi-layer system is thereby advantageous in terms of manufacturing technology. In addition to a piezo actuator, a magnetostrictive or electrostrictive actuating element 12 can also be employed.

A hemi-spherical disk 19 is introduced between actuating drive 12 and pressure piston 11, said hemi-spherical disk 19 comprising a corresponding abutment at the pressure piston 11 and being advantageously capable of compensating tilting of the piezo actuator, of the housing 1 or of the pressure piston 11, for example by avoiding gap variance given piezo end faces that are not plane-parallel. The spherical disk 19 with a corresponding abutment can also be attached at the housing side between actuating drive 12 and housing 1. Given adequate fit precision, the spherical disk 19 can be eliminated.

The primary-side elements (5, 11, 12, 13, 19) are mounted such that they are mechanically pressure-prestressed in a defined way. This is advantageous, for example, given utilization of a ceramic actuating drive 12, for example of a ceramic-like piezo actuator that can be easily destroyed by tensile stresses.

Of course, the primary drive 5 can also be present as a single element, for example as a piston-shaped piezo actuator. The advantages of an optimized design of sub-elements with, for example, a contradictory demand made of the material properties must thereby be foregone. The pressure prestress can be additionally set via spacer disks 101 attached to the housing 1.

At least one, two here, all around O-rings 18 that are let into a channel of the pressure piston 11 and are advantageously composed of an elastomer material are employed for sealing the fit between pressure piston (5, 11) and first bore. The seal of the fit between pressure piston 11 and housing 1 advantageously prevents fluid 6 from emerging in the direction of the actuating drive 12.

A piston bore 16 that discharges into the hydraulic chamber 2 is introduced centered into the pressure piston 11. A lifter piston 14, as part of the lifter element 7, is introduced in the piston bore 16 axially displaceable and with leakage and at least partly countersunk. The piston chamber 9 is limited by the piston bore 16 and the lifter piston 14.

A secondary-side restoring device 8 is attached in the inside of the piston chamber 9, this pressing the lifter piston 14 from the piston bore 16 or, respectively, holding it in a specific, relative position in the piston bore 16 in the load-free condition.

In this embodiment, the lifter piston 14 is implemented in the form of a hollow cylinder open at one face end that has its opening countersunk into the piston bore 16. The piston chamber 9 is then essentially formed of the inside of the lifter piston 14 and the piston bore 16. The secondary-side restoring device 8 fashioned in the form of a compression spring is a compression spring here that is let into the inside of the lifter piston 14. Such an arrangement is advantageously distinguished by its compact dimensioning. The lifter piston 14, however, can also be fashioned, for example, solid and cylindrically.

The piston chamber 9 is filled with fluid 6 via a piston conduit 20. To that end, a potentially throttled bore is conducted through the housing 1, this discharging into a recess present in the pressure piston 11 that is in turn connected to the piston chamber 9. Such an arrangement assures a filling of the piston chamber 9 with fluid even given movement of the pressure piston 11.

Due to the fit between pressure piston 11 and lifter piston 14, fluid 6 flows from the piston chamber 9 into the hydraulic chamber 2.

In this figure, the hydraulic chamber 2 is optionally pressurized with a fluid 6 on the basis of an additional filling conduit 24. The filling conduit 24 is equipped with a filling valve 41 that opens in the direction of the hydraulic chamber 2. As a result of this arrangement, fluid losses in the hydraulic chamber 2 can be compensated faster than by the fluid flow from piston chamber 9 into the hydraulic chamber 2 by itself. In order to maintain the rinsing stream from the piston chamber 9 into the hydraulic chamber 2, the filling conduit 24 lies at a lower pressure level than the piston conduit 20. If the pause time between two actuations of the valve control is long enough, a throttled filling conduit 24 can also be employed instead of the filling valve 41. This has the advantage that it is more simply constructed and lower in wear than a filling conduit 24 with filling valve 41.

An aeration screw that controls an outflow from the hydraulic chamber 2 through the housing 1 can also be present for a simplified filling or aeration of the hydraulic chamber 2 (this is not shown).

A second bore 4 in which a ram 15 is arranged axially displaceable and affected by leakage as further part of the secondary-side lifter element 7 discharges into the hydraulic chamber 2. The lifter piston 14 and the ram 15 are connected to one another rigidly and planarly.

The bores 3, 16 and 4 are advantageously cylindrical and centered relative to one another. An arrangement of two bores 3 and 4 discharging into one another with a longitudinal axis along the same line yields the advantage of a simple and compact structure, connected with a simple possibility for manufacture.

The ram 15 is implemented such that it extends partially into the hydraulic chamber 2. The pressure-active service of the ram in the hydraulic chamber 2 is the projection of its surface in motion direction with reference onto the fluid 6 located in the hydraulic chamber 2. In the present embodiment, the ram 15 is implemented cylindrically in the hydraulic chamber 2 with a washer attached to the face end perpendicular thereto. The cylindrical part of the ram 15 is arranged axially displaceable in the second bore 4; the lifter piston 14 lies planarly and firmly on that pre-surface of the washer lying opposite the pressure piston 11. The pressure-active surface of the ram 15 in the direction of the piston bore 16 is thus calculated as end face of the washer minus the end face of the cylindrical part of the ram 15, and is calculated in the direction of the second bore 4 as end face of the washer minus the end face of the lifter piston 14. For motion commutation, the diameter of the lifter piston 14 must be larger than the diameter of the cylindrical part of the ram 15. Alternatively, it can be demanded as a condition that the piston bore 16 should be wider than the second bore 4.

That part of the second bore 4 opposite the hydraulic chamber 2 is fashioned in the form of a shutoff chamber 26. Both the connecting conduit 27 as well as the discharge 10 discharges into the shutoff chamber. The ram 15 is fashioned such in the shutoff chamber 26 that it carries a seal element 17 in the form of a ball. The throttled connecting conduit 27 can be closed relative to the discharge 10 by the seal element 17. For example, the seal element 17 can also be worked as a conical tip (not shown) of the ram 15, whereby the mouth of the connecting conduit 27 serves as seat of the conical tip.

(a) Quiescent position

In the quiescent position, the actuating drive 12 fashioned as piezo actuator is discharged or, respectively, shorted, so that it has its minimal length therein in axial direction and is at a maximum distance from the second bore 4. The fluid 6 in the hydraulic chamber 2 is under a pressure P1 that corresponds to the standing pressure adjacent at the filling conduit 24, typically 1–25 bar. Due to the leakage between ram 15 and housing 1, fluid 6 escapes from the hydraulic chamber 2 and is let off via the discharge 10 that is pressure-free or, respectively, at a low, static pressure level, for example 1–25 bar. The pressure of the fluid 6 in the piston chamber 9 is higher than P1 due to the occurring leakage flows. A continuous rinsing stream from the piston chamber 9 through the hydraulic chamber 2 into the discharge 10 thus derives. Bubble-free filling of piston chamber 9 and hydraulic chamber 2 are guaranteed by the rinsing stream, since residual gas bubbles can be dissolved in the rinsing stream.

The pressure piston 11 is pressed against the actuating drive 12 or, respectively, the spherical disk 19 by the primary-side restoring element 13 as well as by the pressure P1 of the fluid 6 in the hydraulic chamber 2. As a result of the pressure P1 of the fluid 6 in the hydraulic chamber 2 on the pressure active surface of the ram 15 and as a result of the pressure P2 of the fluid 6 in the connecting conduit 27 on the seal element 17, the lifter element 7 or, respectively, the lifter piston 14 is simultaneously pressed into the piston bore 16. The force of the secondary-side restoring device 8 and the pressure of the fluid 6 in the piston chamber 9 act on the lifter element 7 or, respectively, the lifter piston 14 in a direction opposite thereto.

In quiescent condition, the forces at the secondary-side lifter element 7 are dimensioned such that the seal element 17 closes the connecting conduit 27 off from the discharge 10. Typically, the pressure P2 of the fluid 6 in the connecting conduit 27 lies in the range of 100–2500 bar for an injection system for diesel fuel.

(b) Lifting Event

At the beginning of the lifting event, an electrical signal, for example a voltage or current signal, stretches the actuating drive 12 fashioned as piezo actuator in axial direction via the terminals 121, typically 10–60 $\mu$m. Given such a slight displacement of the actuating drive 12 or, respectively, of the pressure piston 11, the O-rings 18 do not glide against the wall of the housing 1 but only deform elastically, as a result whereof an advantageous seal is achieved. Via the spherical disk 19, the piezo actuator presses the pressure piston 11 in the direction of the hydraulic chamber 2 with great force, so that the pressure P1 in the hydraulic chamber 2 increases.

If the optional filling conduit 24 is equipped with a filling valve 41 (see FIG. 3) opening in the direction of the hydraulic chamber 2, this closes due to the over-pressure (with reference to the quiescent position) arising in the hydraulic chamber 2.

As a result of the increased pressure P1, the pressure exerted on the lifter element 7 in the direction of the piston bore 16 is increased. As a result thereof, the force component acting at the lifter element 7, 14, 15 in the direction of the piston bore 16 increases relative to its opposing force. Given an adequate displacement of the pressure piston 11, corresponding to an adequate pressure P1, the lifter element 7, 14, 15 moves into the piston bore 16, and the connection between connecting conduit 27 and discharge 10 is opened. The following flow of the fluid 6 from the connecting conduit 27 via the shutoff chamber 26 into the discharge 10 leads to a pressure drop in the connecting conduit 27. Since the connecting conduit 27 is typically a part of a hydraulic or, respectively, hydraulic-mechanical system, this system can be controlled via the pressure drop, for example the motion of a working piston, for example in a fuel injector.

The pressure drop in the connecting conduit 27 is all the greater the higher the pressure difference between P2 and the pressure adjacent at the discharge. For example, the drop of the pressure given P2 equals 100–2500 bar in quiescent position and a pressure-free discharge occurs nearly suddenly. A slight pressure at the discharge 10 is additionally advantageous because the effect of a pressure wave occurring in the shutoff chamber 26 can thus be kept small. This could otherwise deteriorate the function of the piezo-hydraulic drive.

The lift of the lifter element 7, 14, 15, typically 60–360 $\mu$m, can be limited by a detent 23. The system is thereby designed such that an adequate pressure or, respectively, force reserve is still present given detent of the ram 15, so that the ram 15 is still open for an adequate time despite the leakage occurring at the hydraulic chamber 2. On the other hand, the leakage is dimensioned such that, for example given an interruption of the electrical terminals 121 in the charged condition of the piezo actuator, an automatic return of the lifter element 7 into the quiescent position is advantageously assured.

(c) Return into Quiescent Position

The lifting event is ended due to the discharge of the piezo actuator. Given contraction of the piezo actuator, the mechanically prestressed saucer spring 13 effects the restoring of the pressure piston 11 and of the spherical disk 19. If the hydraulic chamber 2 is filled with fluid 6 via a filling conduit 24 equipped with a filling valve 41 open at one side, the pressure P1 briefly sinks below the pressure occurring in the quiescent condition due to the leakage losses occurring during the actuation duration, whereupon the filling valve 41 opens and compensates the fluid losses in a short time. Given relaxation of P1 to the standing pressure prevailing in quiescent position, the lifter element 7, 14, 15 is in turn returned and the connecting conduit 27 is closed off from the discharge 10. As a result thereof, the connecting conduit 27 is again charged to the full pressure P2 adjacent in quiescent position.

The valve control constructed in the above-described way is advantageously characterized in that its function is assured over a great range of operating temperature. This is achieved by the leakages by which a compensation of temperature-conditioned length changes of piezo actuator or, respectively, housing 1 or length changes thereof caused by aging or by settling affects is achieved. The advantage additionally derives that this valve control is significantly less insensitive to tolerances from a fabrication-oriented point of view than is, for example, a membrane-hydraulic valve control.

Figure 2:
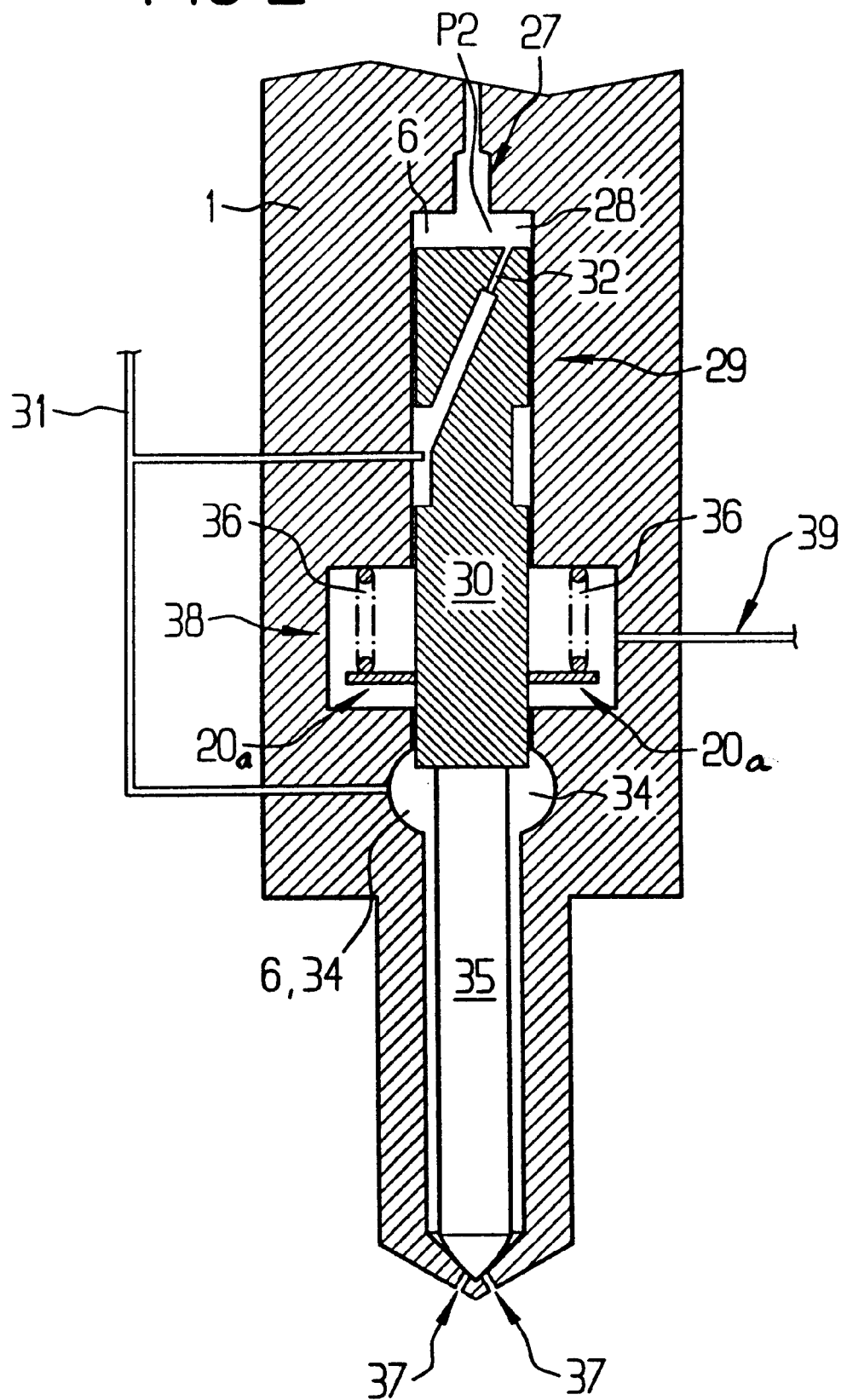
FIG. 2 is a sectional view of elements of a fuel injection system controlled by the valve control shown in FIG. 1.

As a sectional view, FIG. 2 shows a side view of an application of the system shown in FIG. 1 for valve control in an apparatus for dosing fluid. The connecting conduit 27 leads into a working chamber 28 that is supplied with fluid 6 by a throttled feed 31, for example by a "common rail" feed under the full (rail) pressure of 100–2500 bar. The pressure in the working chamber 28 controls the movement of a working piston 30 guided axially displaceable in a further bore 29, which can be fitted in affected by leakage or hydraulically tight. In this figure, the connection between working chamber 28 and feeder 31 is achieved via a bore 32 conducted through the working piston 30 that, for compensating the movement of the working piston 30, is worked in as channel at its end adjoining the feeder 31.

When, for example, the bore 32 is implemented throttled, work chamber 28 and shutoff chamber 26 (FIG. 1) can also be implemented as one chamber that, for example, can be equipped with detents for limiting the stroke of the working piston 30.

A fuel injector needle 35 with which one or more injection nozzles can be closed is secured at that side of the working piston 30 facing away from the working chamber 28. A fuel chamber 34 that is likewise supplied with fluid 6 via the conduit 31 is provided at the same side of the working piston 30. The fuel injector needle 35 is not guided in hydraulically sealed fashion, so that fluid 6 proceeds from the fuel chamber 34 via the fit between fuel injector needle 35 and housing 1 to the injection nozzles 37. The stroke of the working piston typically amounts to 120–360 μm.

A part of the further bore 29 is expanded as injection needle spring chamber 38 in which an injector needle spring 36 that is supported at the housing 1 presses the working piston 30 onto the injection nozzles 37. The injector needle spring 36 is secured to the working piston 30 with, for example, a Seeger circlip ring 20a. The at least one injection nozzle 37 is advantageously closed by this injector needle spring 36 given an outage of the high-pressure system, and a delivery of fluid is thus prevented, for example of diesel or gasoline into a combustion chamber of a motor. A return conduit 39 through which fluid 6 that proceeds into the injector needle spring space 38 due to leakage at the working piston 30 flows off discharges into the injector needle spring space 38.

Due to the pressure of the fluid 6 in the fuel chamber 34, the working piston 30 experiences a force that presses it in the direction of the working chamber 28. The pressure-active surface of the working piston 30 at the fuel chamber 34 is thereby smaller than that at the working chamber 28.

When the valve control is in quiescent position, i.e. the lifter element 7 closes the connecting conduit 27 off from the discharge 10, then the full pressure delivered by the conduit 31 is also adjacent at the working chamber 28. The working piston 30 is thus pressed against the injection nozzles 37 and closes them.

During this stroke event, the pressure P2 in the connecting conduit 27 drops and, thus, the pressure in the working chamber 28 also drops. As a result thereof, the force acting on the working piston in the direction of the injection nozzles 37 is reduced to such an extent that the working piston 30 moves in the direction of the working chamber 20 and thus opens the injection nozzles 37. As a result thereof, the fluid 6 from the fuel chamber 34 is output toward the outside through the at least one injection nozzles 37.

At the end of the injection event, connecting conduit 27 is again closed off from the discharge 10, so that the pressure in the working chamber 28 is built up again and, thus, the working piston 30 presses the fuel injector needle 35 back toward the injection nozzles 37.

This application is especially advantageous in direct diesel injection with the assistance of a common high-pressure fuel conduit 31 ("common rail").

The fluid 6 can both be a liquid, for example hydrocarbons such as diesel, benzene, kerosine or petroleum, ersatz fuel such as rapemethylester or a gas as well, for example natural gas.

A device constructed in this way for dosing fluid has the advantage that the motion of a piezo actuator that is already affected by only extremely small dead times is transmitted practically delay-free onto the motion of the working piston. Further, the highly pressurized hydraulic circulation of the fluid dosing can be controlled by a comparatively slight standing pressure in the hydraulic chamber 2 because of the high pressing capability of the piezo element. In fuel injection, for example, it thereby becomes possible to generate a well-dosed pilot injection.

Figure 3:
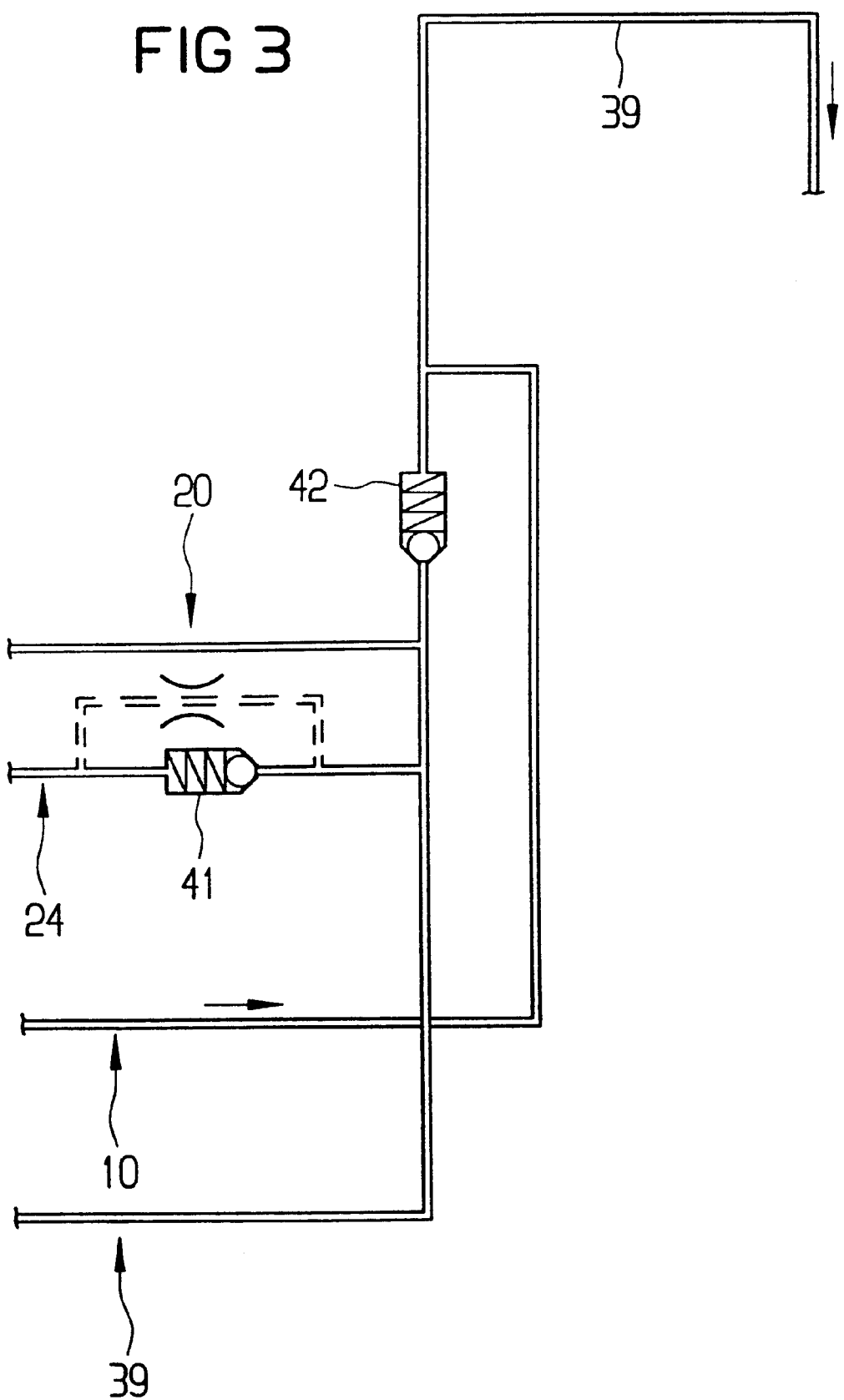
FIG. 3 illustrates pressure conduits belonging to the valve control and to the fuel injection system shown in FIGS. 1 and 2.

FIG. 3 schematically shows an advantageous development of the return system of an injection system according to FIGS. 1 and 2.

The fluid 6 leaking from the fuel chamber 34 into the fuel injector spring space 38 is carried off through the return conduit 39. A pressure-control valve 42 is introduced in the return conduit 39, this backing up the pressure in the fuel injector spring space 38, typically to 1–25 bar. The piston conduit 20 branches off from the return conduit 39 above the pressure control valve 42 (in flow direction). The discharge 10 discharges into the return conduit 39 below the pressure control valve 42. The opening pressure of the pressure control valve 42 thus corresponds to the pressure in quiescent condition in the piston conduit 20 and the piston chamber 9. When the optional filling conduit 24 equipped with a filling valve 41 and leading into the hydraulic chamber 2 is present, then the standing pressure, i.e. the pressure P1 in quiescent condition, in the hydraulic chamber 2 corresponds to the pressure difference of the opening pressure of pressure control valve 42 and filling valve 41. This pressure difference enables the rinsing stream from the piston chamber 9 to the hydraulic chamber 2. Since the discharge 10 is at a lower pressure level than the return conduit 39 below the pressure control valve 42, a continuous rinsing stream of fluid 6 also derives through the hydraulic chamber 2 along the fit between lifter piston 14 and housing 1. The filling valve 41 is advantageous for a fast compensation of the leakage losses occurring during the actuation phase.

The filling conduit 24 can be foregone, for example given a drive of an injector with low pulse/pause ratios as standard, for example, in direct diesel injection (for example, maximum injection duration 4 ms every 24 ms given 5,000 rpm). A compensation of the leakage occurring during the short actuation duration of the valve control (for example, 4 ms) is assured as a result of relatively long pauses (for example, 20 ms).

FIG. 4 shows a comparison of the fluid quantity ("fuel quantity") output by an injection system according to FIGS. 1 and 2 in mm³/stroke to the drive time ("pulse width") of the actuating drive for one stroke in ms. The rail pressure P2 amounts to 400 bar.

One can see that a threshold of the drive time for the delivery of fluid (diesel fuel here) of somewhat less than 0.4 ms is present. The reason for this is that the short excursion of the actuating drive 12 (a ceramic multi-layer piezo actuator here) effects only a slight increase of the pressure P1 in the hydraulic chamber 2. This pressure increase is inadequate for overcoming the force exerted on the lifter element 7, 14, 15 by the pressure in the piston chamber 9 and by the secondary-side restoring device 8. The fuel injector needle 35 is lifted to such an extent only after approximately 0.4 ms that fluid 6 can emerge from the injection nozzles. After approximately 1.2 ms drive time, a largely linear curve is established between fluid quantity output and drive time.

FIG. 4 emphatically demonstrates the good controllability and short dead time of an embodiment of the inventive valve control. The suitability for employment in fuel injection systems is clearly shown by this figure.

The invention, of course, is not limited to the described exemplary embodiments. Instead of the piezoelectric actuating drive 12, thus, an electrostrictive or magnetostrictive actuator can also be employed as actuating drive 12.

For example, the position of sub-elements relative to one another can also be differently designed, for example on the basis of a lifter element 7 completely countersunk into the second bore 4 or on the basis of play of the individual sub-elements.

The embodiments in FIGS. 1 and 2 have an essentially axially symmetrical structure. Of course, one can depart therefrom in that, for example, the device for valve control is constructed of spatially distributed pressure chambers that are connected to one another via fluid conduits. However, a loss of functionality must thereby be accepted.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

What is claimed is:

1. An apparatus for controlling the operation of a valve, the apparatus comprising:

a housing comprising a hydraulic chamber, the hydraulic chamber being disposed between a first bore and a second bore so that the first bore and the second bore discharge into the hydraulic chamber, the first bore at least partially accommodating a primary drive, the primary drive being axially displaceable within the first bore, the primary drive comprising a piston bore disposed therein, the second bore at least partially accommodating a secondary-side lifter element that extends through the hydraulic chamber and at least partially extends into the piston bore, the lifter element being axially displaceable within the second bore, hydraulic chamber and piston bore, the lifter element and the piston bore defining a piston chamber within the piston bore, the lifter element comprising a first surface disposed in the hydraulic chamber that faces the primary drive and the piston bore, the lifter element further comprising a second surface disposed in the hydraulic chamber that faces the secondary bore, the primary drive comprising a first surface disposed in the first bore that faces the hydraulic chamber and the first surface of the lifter element, the housing further comprising a piston conduit in communication with the piston chamber, the piston chamber being in communication with the hydraulic chamber, the second bore being connected to a connecting conduit with a distal end of the lifter element disposed therebetween, the second bore also being connected to a discharge conduit, the connecting conduit being maintained at a pressure greater than the discharge conduit, the first surface of the lifter element being smaller than the first surface of the primary drive, the first surface of the lifter element being smaller than the second surface of the lifter element, the distal end of the lifter element selectively isolating the connecting conduit from the discharge conduit.

2. The apparatus of claim 1 further comprising a secondary-side restoring element disposed in the piston chamber and which engages the lifter element and biases the lifter element out of the piston chamber.

3. The apparatus of claim 1 further comprising a filling conduit pressurized with fluid and which is connected to the hydraulic chamber, the filling conduit comprising a filling valve that is biased towards a closed position and opens when the hydraulic chamber reaches a predetermined low pressure.

4. The apparatus of claim 1 wherein the first bore, the second bore and of the piston bore are coaxial.

5. The apparatus of claim 1 wherein the primary drive comprises a pressure piston disposed between the hydraulic chamber and an actuating drive, the actuating drive displacing the pressure piston in the first bore, the primary drive further comprising a primary-side restoring element disposed between the pressure piston and the hydraulic chamber, the primary-side restoring element biasing the pressure piston away from the hydraulic chamber, the piston bore being disposed in the pressure piston.

6. The apparatus of claim 5 further comprising a hemispherical disk disposed between the actuating drive and the pressure piston.

7. The apparatus of claim 5 further comprising a hemispherical disk disposed between the actuating drive and the housing.

8. The apparatus of claim 6 wherein the actuating drive is an element selected from the group consisting of piezoelectric, electrostrictive and magnetostrictive.

9. The apparatus of claim 5 wherein the primary-side restoring element is a tubular spring.

10. The apparatus of claim 5 wherein the primary-side restoring element comprises at least one saucer spring.

11. The apparatus of claim 1 further comprising at least one elastomer ring disposed between the primary drive and the housing for providing a seal therebetween.

12. The apparatus of claim 1 wherein the second bore comprises a shutoff chamber, the distal end of the lifter being disposed in the shutoff chamber, the connecting conduit and the discharge conduit being connected to the shutoff chamber, the distal end of the lifter element further comprising a seal element for sealingly engaging the connecting conduit and isolating the connecting conduit from the discharge conduit.

13. The apparatus of claim 1 wherein the lifter element further comprises a lifter piston at least partially disposed in the piston bore axially displaceable therein, the lifter piston being rigidly connected to a ram, the ram being partially disposed in the second bore and partially disposed in the hydraulic chamber.

14. The apparatus of claim 13 wherein the lifter piston comprises a hollow cylinder comprising an open end that extends into the piston bore.

15. The apparatus of claim 14 further comprising a secondary-side restoring element disposed in the piston chamber and which extends into the hollow cylinder and biases the lifter element out of the piston chamber.

16. The apparatus of claim 1 wherein the hydraulic chamber is connected to a plurality of secondary-side subsystems.

17. The apparatus of claim 1 wherein said apparatus is a component of a hydraulic system.

18. The apparatus of claim 1 wherein said apparatus is a component of a fuel injection system.

19. The apparatus of claim 18 wherein the housing further comprises a further bore and a working piston disposed in the further bore, the further bore and working piston defining a working chamber, the connecting conduit being connected to the working chamber, the working chamber being connected to a feed conduit, movement of the working piston being controlled by pressure of the working chamber.

20. The apparatus of claim 19 wherein the working chamber is connected to the feed conduit by way of a throttle bore that extends through the working piston.

21. The apparatus of claim 20 wherein pressure in the working chamber controls whether the distal end of the lifter isolates the connecting conduit from the discharge conduit.

22. The apparatus of claim 21 wherein the working piston is connected to a fuel injector needle disposed in the further bore, the further bore also comprising at least one nozzle, the working piston being biased away from the working chamber and the fuel injector needle being biased towards the nozzle by a fuel injector spring, the further bore further comprising a fuel chamber, the fuel chamber being connected to the feed conduit, the working piston further comprising a first end disposed in the working chamber and a second end disposed in the fuel chamber, pressure in the fuel chamber biasing the working piston towards the working chamber.

23. A method for controlling a valve, the method comprising the following steps:

providing an apparatus comprising
a housing comprising a hydraulic chamber, the hydraulic chamber being disposed between a first bore and a second bore so that the first bore and the second bore discharge into the hydraulic chamber,
the first bore at least partially accommodating a primary drive, the primary drive being axially displaceable within the first bore, the primary drive comprising a piston bore disposed therein, the second bore at least partially accommodating a secondary-side lifter element that extends through the hydraulic chamber and at least partially extends into the piston bore, the lifter element being axially displaceable within the second bore, hydraulic chamber and piston bore,
the lifter element and the piston bore defining a piston chamber within the piston bore,
the housing further comprising a piston conduit in communication with the piston chamber, the piston chamber being in communication with the hydraulic chamber,
the second bore being connected to a connecting conduit with a distal end of the lifter element disposed therebetween, the second bore also being connected to a discharge conduit;

during at least a portion of the operation of the valve, maintaining the valve in a quiescent position wherein the primary drive is displaced away from the hydraulic chamber, the lifter element is displaced away from the piston bore and into the second bore and the distal end of the lifter element isolates the connecting conduit from the discharge conduit;

during at least a portion of the operation of the valve, moving the lifter element into the piston bore by reducing the volume of the hydraulic chamber with the primary drive so that the pressure the hydraulic chamber is increased resulting in the lifter element being moved into the piston bore and the distal end of the lifter element away from the connecting conduit thereby establishing communication between the connecting conduit and the discharge conduit thereby reducing pressure in the connecting conduit;

returning the valve to the quiescent position by pushing the primary drive away from the hydraulic chamber so that the pressure therein decreases and resulting in movement of the lifter element away from the piston bore to the distal end of the lifter element engages the connecting conduit and isolates the connecting conduit from the discharge conduit;

leaking fluid between the piston chamber and the hydraulic chamber;

replenishing fluid leaked from the piston chamber with fluid supplied from the piston conduit.

24. The method of claim 23 wherein the primary drive comprises a pressure piston disposed between the hydraulic chamber and an actuating drive, the actuating drive having a length and displacing the pressure piston in the first bore, the primary drive further comprising a primary-side restoring element disposed between the pressure piston and the hydraulic chamber, the primary-side restoring element biasing the pressure piston away from the hydraulic chamber, the piston bore being disposed in the pressure piston; and the step of maintaining the valve in the quiescent position further comprises reducing the length of the actuating drive resulting in the pressure piston being pushed maximally away from the hydraulic chamber by the primary-side restoring element and the pressure the hydraulic chamber; and the step of lifting the lifter element further comprises increasing the length of the actuating drive so that the pressure piston is pushed in the direction of the hydraulic chamber by the actuating drive; and the step of returning the valve to the quiescent position further comprises reducing the length of the actuating drive so that the pressure piston is pushed away from the hydraulic chamber by the primary-side restoring element and the pressure in the hydraulic chamber.

25. The method of claim 24 wherein the valve is part of a fuel injection system and the housing further comprises a further bore and a working piston disposed in the further bore, the further bore and working piston defining a working chamber, the connecting conduit being connected to the working chamber, the working chamber being connected to a feed conduit, the working chamber is connected to the feed conduit by way of a throttle bore that extends through the working piston, wherein pressure in the working chamber controls whether the distal end of the lifter isolates the connecting conduit from the discharge conduit, the working piston being connected to a fuel injector needle disposed in the further bore, the further bore also comprising a nozzle, the working piston being biased away from the working chamber and the needle being biased towards sealing engagement with the nozzle by a fuel injector spring, the further bore further comprising a fuel chamber, the fuel chamber being connected to the feed conduit, the fuel chamber being in communication with the nozzle, the working piston further comprising a first end disposed in the working chamber and a second end disposed in the fuel chamber, pressure in the fuel chamber biasing the working piston towards the working chamber and the needle away from the nozzle, and the step of maintaining the valve in the quiescent position further comprises pushing the working piston away from the working chamber so that the fuel injection needle closes the nozzle in communication with the fuel chamber; and the step of lifting the lifting element further comprises reducing pressure in the working chamber by reducing pressure in the connecting conduit so that the working piston is displaced in the direction of the working chamber by pressure in the fuel chamber thereby moving the needle away from the nozzle and permitting the fluid to flow through the nozzle; and the step of returning the valve to the quiescent position further comprises increasing the pressure in the working chamber by increasing pressure in the connecting conduit so that, due to the pressure in the working chamber and the bias of the fuel injection spring, the working piston pushed away from the working chamber and the needle engages the nozzle.

26. The method of claim 25 wherein the pressure in the hydraulic chamber ranges from 1 to 25 bar.

27. The method of claim 26 wherein the pressure in the piston chamber in the quiescent position ranges from 100 to 2500 bar.

28. The method of claim 27 wherein the difference in length of the actuating drive between quiescent position and the lifting position ranges from 10 to 60 $\mu$m.

29. The method of claim 28 wherein the lifter element moves a distance ranging from 60 to 360 $\mu$m between the quiescent and lifting positions.

30. The method of claim 29 wherein the working piston moves a distance ranging from 120 to 360 $\mu$m between the quiescent and lifting positions.

31. The method of claim 30 wherein the actuating drive is an element selected from the group consisting of piezoelectric, electrostrictive and magnetostrictive.

* * * * *